March 28, 1944.  F. R. SIAS  2,345,011
PULL-OFF DEVICE FOR TELEMETER INDICATORS
Filed Jan. 14, 1943  2 Sheets-Sheet 1
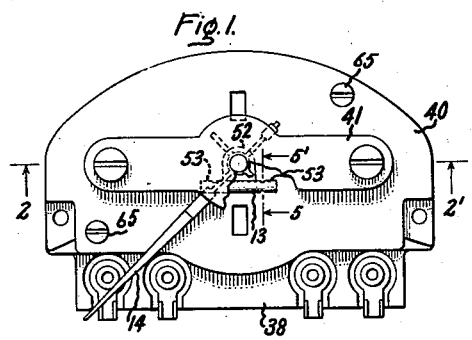
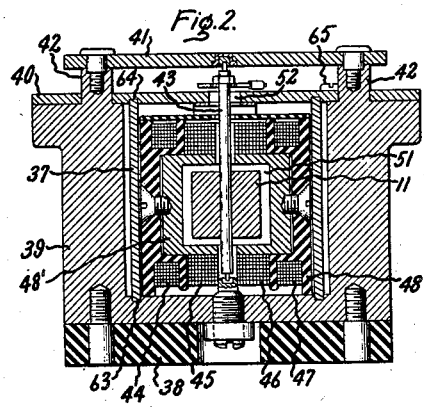
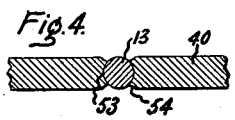
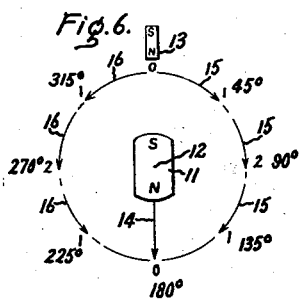
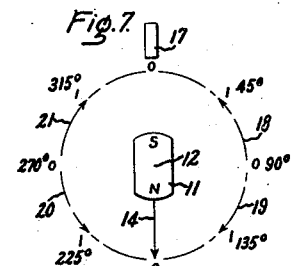
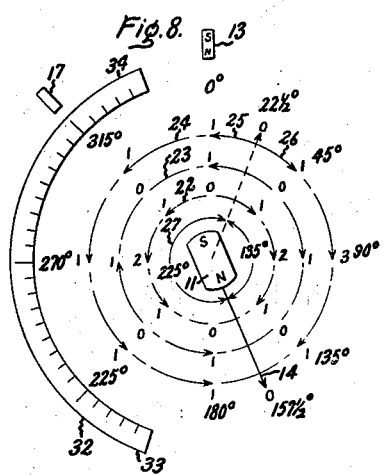
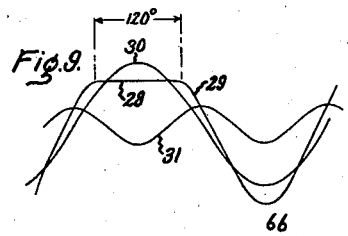
Inventor:
Frederick R. Sias,
by Harry E. Dunham
His Attorney.

March 28, 1944.   F. R. SIAS   2,345,011
PULL-OFF DEVICE FOR TELEMETER INDICATORS
Filed Jan. 14, 1943   2 Sheets-Sheet 2
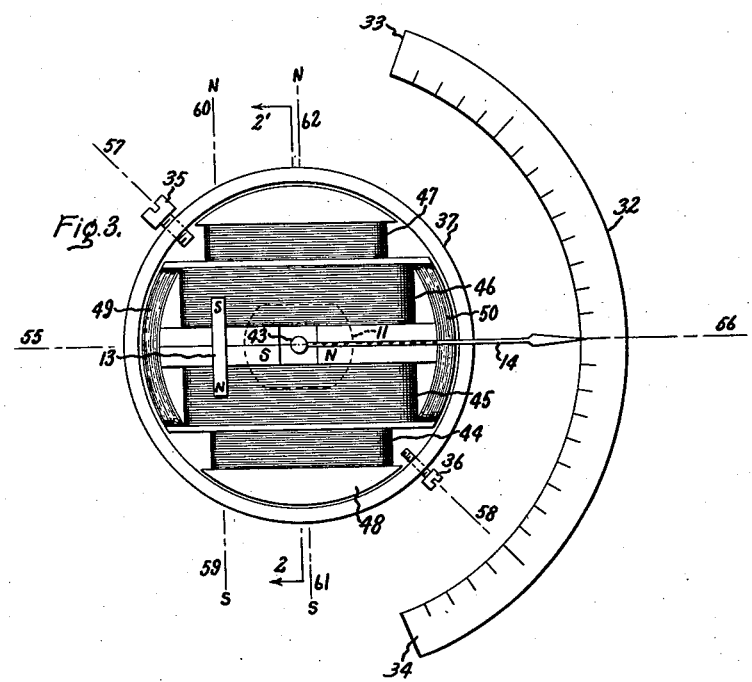
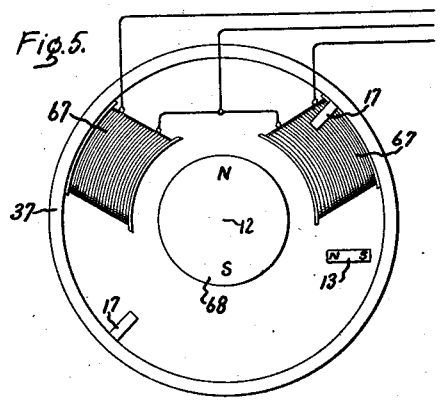
Inventor:
Frederick R. Sias,
by Harry E. Dunham
His Attorney.

Patented Mar. 28, 1944

2,345,011

UNITED STATES PATENT OFFICE 2,345,011

PULL-OFF DEVICE FOR TELEMETER INDICATORS

Frederick R. Sias, Marblehead, Mass., assignor to General Electric Company, a corporation of New York Application January 14, 1943, Serial No. 472,317

6 Claims. (Cl. 171—95)

My invention relates to current responsive devices and measuring instruments. It concerns particularly ratio instruments and receivers or indicators for direct current telemetering systems.

It is an object of my invention to provide improved pull-off arrangements for pulling the pointer or the movable index or target of a receiver or indicator to an off-scale position in case of power failure.

A further object of my invention is to provide nearly uniform pull-off force throughout a large scale angle, and to provide a pull-off arrangement suitable for use with a long scale instrument which does not affect the shape of the instrument calibration curve and which does not require strong pull-off torque in order to be effective.

Still another object is to decrease voltage and temperature errors in instruments having pull-off arrangements.

Other and further objects and advantages will become apparent as the following description proceeds.

The present application is a continuation-in-part of my copending applications, filed November 9, 1942, Serial No. 465,081; filed November 9, 1942, Serial No. 465,079; filed November 21, 1942, Serial No. 466,436; all assigned to the same assignee as the present application.

In certain types of indicating and measuring instruments, particularly receivers or indicators for telemetering systems, it is desirable to provide an arrangement for moving the pointer or index off scale in the case of failure of a source of current energizing the telemetering system in order to guard against false readings or indications. One form of pull-off arrangement for this purpose is described in Patent No. 2,181,803, Faus. The Faus patent relates to an indicator of the moving magnet type in which the rotor consists of a permanent magnet. A pull-off magnet consisting of a permanently magnetized rod is mounted at one side of the axis of rotation of the rotor in such an angular position as to set up a magnetic field which deflects the rotor to an off-scale position, that is, a position in which the pointer or index lies beyond the end of the scale to show that the system is not properly energized and to prevent false readings or indications. It will be understood that the torque produced by the reaction between the pull-off magnet and the rotor is made less than that provided by the normal instrument field which deflects the rotor according to the indications to be transmitted by the telemetering system when the system is properly energized. When the system is energized the pull-off torque has relatively little effect on the deflection of the rotor but obviously will produce some modification of the scale calibration in the case of a deflecting pointer measuring instrument having a graduated scale cooperating with a pointer carried by a rotor. Modified pull-off arrangements are described in my copending application Serial No. 465,079, in which compact constructions are provided; and in each case not only the pull-off magnet but the entire instrument movement is enclosed in a small hollow cylindrical shield.

The pull-off magnet exerts a torque on the moving magnet or rotor of the indicator and this torque varies substantially sinusoidally with the angular position of the rotor so that the effect of the pull-off field on the instrument calibration during normal operation of the instrument is different at different angular positions of the rotor. In order to make the pull-off field substantially uniform throughout the length of the instrument scale and thereby avoid distortion of the instrument scale, I provide a modified pull-off arrangement. In carrying out my invention in its preferred form I combine with the permanently magnetized pull-off magnet a second pull-off element which is composed of magnetizable material which does not tend to become permanently magnetized but in which a magnetic flux is readily induced by the magnetic field. The second pull-off element is so mounted in relation to the moving magnet of the instrument that the said second element also tends to deflect the moving magnet to an off-scale position. The relationship between the two pull-off elements is made such that, throughout the scale range of the instrument, variations in the pull-off torque from one pull-off element tend to compensate for variations in pull-off torque of the other pull-off element as the angular position of the moving magnet is varied.

A better understanding of the invention will be afforded by the following detailed description considered in connection with the accompanying drawings, and those features of the invention which are believed to be novel and patentable will be pointed out in the claims appended hereto.

In the drawings Fig. 1 is a plan view of a direct current telemeter indicator or receiver embodying my invention; Fig. 2 is a view of a section cut through the apparatus of Fig. 1 by a plane 2, 2' indicated in Fig. 1; Fig. 3 is a fragmentary view of the apparatus of Fig. 1 with the cover and certain other parts removed to expose the interior;

Fig. 4 is a view through the cover or subbridge of the apparatus of Figs. 1 and 2 cut by a plane 5, 5' indicated in Fig. 1, so as to show the manner of mounting the pull-off magnet; Fig. 5 is a diagrammatic view of another embodiment of my invention illustrating my pull-off arrangement used in a modified form of receiver or indicator; Fig. 6 is a diagram explaining the principle of operation of a permanently magnetized pull-off magnet employed alone; Fig. 7 is a diagram explaining the manner of operation of a magnetizable but not permanently magnetized pull-off element used alone; Fig. 8 is a diagram explaining the effect of combining the pull-off members of Figs. 6 and 7, and Fig. 9 is a set of curves explaining graphically the operation of the pull-off units as shown diagrammatically in Figs. 6, 7 and 8. Like reference characters are used throughout the drawings to designate like parts.

It will be understood that in ratio instruments and direct current telemeter receivers or indicators of the moving magnet type a movable, preferably rotatable, magnet or rotor, is actuated by the magnetic field produced by a stationary field structure. The field structure ordinarily consists of electrical windings of two or more circuits comprising electrical coils producing magnetic fields, the resultant of which depends upon the relative magnitudes of electrical currents in the instrument circuits so that variations in the circuit produce variations in the angular position of a resultant magnetic field, thereby causing deflection or rotation of the moving magnet or rotor. In the case of a measuring instrument the rotor carries a pointer and there is a graduated scale cooperating with the pointer. My present invention is not directly concerned with these features of the instrument or indicator per se, and I shall therefore first describe the operation of the pull-off arrangement without reference to the magnetic field produced by the field structure of the instrument.

In Fig. 6 there is shown a permanent magnet 11 rotatable about a center point 12 with a line of polarization NS transverse to the axis of rotation of the magnet 11, which thus forms the rotor of an instrument or indicator, the field structure of which is not shown. For deflecting the rotor 11 to an off-scale position when the field structure is not energized, a permanent magnet 13 may be provided which is mounted in a fixed position so as to form a pull-off magnet. For convenience the pull-off magnet 13 is shown in Fig. 6 as having its physical axis intersecting the axis of rotation 12 of the rotor 11, but it is understood that Fig. 6 is merely diagrammatic and does not necessarily represent the actual mounting position of the pull-off magnet in actual apparatus.

The diagrammatically represented pull-off magnet 13 in Fig. 6 is to be considered as representing permanent magnet pull-off flux having a direction parallel to the physical axis of the magnet 13. Thus when the rotor 11 is in the position shown in Fig. 6 its line of polarization NS is parallel to the pull-off field produced by the pull-off magnet 13, and in the same sense, so that there is no tendency for the rotor 11 to deflect. For convenience in designating various angular positions of the rotor 11 a pointer 14 is shown diagrammatically. The pointer 14 is in a position marked as an 180 degree position in Fig. 6. If the rotor 11 should be in any other position than that shown in Fig. 6, the pull-off field tends to return it to the position there shown. The pull-off torque is greatest when the magnet is in either position 90 degrees from the position shown in Fig. 6, that is, with the pointer 14 in at either the 90 degree or the 270 degree position, since in this case the magnetic moment is greatest. This is represented in Fig. 6 by the numeral 2 approximately representing the pull-off torque in the 90 degree and the 270 degree positions. The numeral 1 is intended to represent that the pull-off torque is about half as great in the 45, 135, 225 and 315 degree positions. However, for a magnet rotating in a perfectly uniform pull-off field the pull-off torque would theoretically vary sinusoidally with the angular position of the rotor. As represented by the arcuate arrows 15 the pull-off torque is clockwise in the 45, 90, and 135 degree positions. This is true also at the intermediate positions between zero and 180 degrees at the right-hand side of the circle. As represented by arcuate arrows 16 the pull-off torque is counterclockwise in the rotor positions in the other half of the circle. Thus the pull-off torque from the permanent magnet 13 varies between a maximum in one direction and a maximum in the opposite direction and has two opposite peak values as the rotor is rotated 360 degrees.

On the other hand, if the permanent magnet 13 were replaced by a piece of magnetic material 17 represented in Fig. 7 which is magnetizable but does not become a permanent magnet, that is, has relatively high permeability and low coercive force, the pull-off torque would have two maximum values and two minimum values, throughout the 360 degree position of the rotor 11. Thus, the pull-off torque will be zero as indicated by the numerals zero in Fig. 7 when the pointer 14 is either in the 180 degree or the zero degree position because in either case the line of magnetization NS of the rotor 11 is parallel with the magnetic field which the rotor 11 induces in the soft iron piece 17. In addition, there are unstable positions at 90 degrees and 270 degrees in which the pull-off torque is also zero. It has maximum values indicated by the numeral 1 placed at the four positions which are 45 degrees from the zero torque positions. As represented by the arcuate arrows 18, 19, 20 and 21 the pull-off torque reverses from counterclockwise in the 45 degree position, to clockwise at the 135 degree position; counterclockwise at the 225 degree position, and clockwise at the 315 degree position.

The effect of combining the pull-off arrangements of Figs. 6 and 7 is represented in Fig. 8 where it is assumed that the dimensions and spacing of the elements and the strengths of the magnets are such that the maximum torque produced by the soft iron piece 17 is half that produced by the permanent magnet 13. This is represented in Figs. 6, 7 and 8 by the numerals 1 and 2 at the various angular positions representing the relative values of pull-off torque. In Fig. 8 furthermore the soft iron piece 17 has been mounted 45 degrees counterclockwise from the permanent magnet 13 so that it will tend to deflect the rotor 11 further counterclockwise, that is, further beyond the zero end of the scale for a reason which will become apparent hereinafter.

In Fig. 8 the inner circle of arcuate arrows 22 represents the pull-off torques produced by the permanent magnet 13 as shown in Fig. 6. The next circle of arcuate arrows 23 represents the pull-off torques produced by the soft iron piece 17; and the outer circle of arcuate arrows 24 represents the combined pull-off torques. It will be observed that the circle of arrows 22 corresponds to the arrows shown in Fig. 6. The circle of arrows 23 corresponds to arrows shown in Fig. 7 except for rotation of the entire figure 45 degrees counterclockwise.

By adding the torque values represented by the numerals at various positions in the circles 22 and 23 and taking into consideration the direction or sense of the torque, the resultant torques at the various angular positions may be found and these are represented by the numerals in the outer circle 24. Thus in the zero degree position the permanent magnet torque being zero and the soft iron torque having the value of 1, the resultant torque is the value of 1 in the counterclockwise direction. On the other hand at the 45 degree position where the permanent magnet pull-off torque has the value of 1 and the soft iron pull-off torque has the value of zero, the resultant torque has the value of 1 in the clockwise direction. The torques at these two points are shown by the directions of the arrows 25 and 26, respectively. At the 90 degree position the torques from the two pull-off elements are cumulative and give a total resultant torque of 3 in the clockwise direction. On the other hand, in all the other positions differing from each other by 45 degrees, the resultant torque has the uniform value of 1. Thus at the 270 degree position the permanent magnet torque which has the value of 2 in the counterclockwise position is opposed by the soft iron torque having the value of 1 in the clockwise direction and the resultant torque has the value of 1 in the counterclockwise direction. Similarly all other positions from 180 degrees to 360 (or zero) degrees on the left-hand side of the circle have the value of 1 in the counterclockwise direction. At the 22½ degree and the 157½ degree positions the resultant torque falls to zero and between the 22½ degree and 157½ degree positions on the right-hand side of the circle the torques have the reverse direction, that is, clockwise instead of counterclockwise.

Although Fig. 8 is diagrammatic and does not take into consideration minor variations at intermediate positions, it indicates that throughout an angle of 225 degrees represented by the double ended arcuate arrow 27 there is no reversal in the pull-off torque and this torque remains substantially uniform throughout an angle of 180 degrees represented by the left-hand side of the circle. If intermediate positions were taken into consideration, some fluctuation in pull-off torque would be observed. However, the degree of uniformity of pull-off torque may be improved at a slight expense of the length of scale angle over which the torque is uniform by making the maximum pull-off torque from the soft iron element 17 a little less than one-half the maximum pull-off torque from the permanent magnet 13. Where the instrument is to have a scale length of approximately 120 degrees. I consider it most satisfactory to make the soft iron pull-off torque $\frac{1}{10}$ of the permanent magnet pull-off torque so that the resultant pull-off torque is about $\frac{1}{10}$ of the maximum pull-off torque which would be obtained with the permanent magnet 13 alone.

As illustrated in Fig. 9 throughout an angular range of approximately 120 degrees the resultant torque represented by the substantially flat portion 28 of the curve 29 is very nearly uniform. In Fig. 9 the curve 30 is a fundamental frequency sine wave representing values of torque produced by the permanent magnet 13 and the curve 31 is a double frequency sine wave representing the torque produced by the soft iron element 17, the peak value of the curve 31 being $\frac{1}{10}$ of the peak value of the curve 30. The curve 29 is the resultant of the two curves 30 and 31. In all three curves the values of torque are plotted in a vertical direction, and the angular positions of the pointer 14 are represented by the distances in the horizontal direction.

When the pull-off arrangement represented diagrammatically in Fig. 8 is employed, the instrument scale is mounted in such a position that the pointer 14 sweeps the scale while the rotor is within the region represented by the 225 degree arc 27. For example, a graduated scale 32 may be mounted in the position shown in Fig. 8 with respect to the pull-off elements, the rotor and the pointer. The scale 32 may have an angular length from 120 to 150 degrees. In the most commonly used long scale telemeter receivers one end of the scale, usually the counterclockwise end 33, is referred to as the zero end of the scale, and the other end 34 is referred to as the full scale end. It will be understood, however, that in some cases the indicator will be used for the measurement or indication of quantities which would call for placing a zero division at the center or some other portion of the scale. In using the expression "zero end of the scale" in the description and claims therefor, I do not mean to limit the invention to any specific type of scale calibration but I mean to include any scale or set of indices having an end point beyond which a pointer or target carried by the movable member is carried when the source of power energizing the instrument fails.

The combination permanent magnet and soft iron pull-off torque arrangement represented by Fig. 8 may take various practical forms some of which will be described more in detail in connection with direct current telemeter receivers of the types disclosed in my aforesaid copending applications, Serial No. 465,079 and Serial No. 465,081. For example, one way of carrying out my invention is to provide a permanently magnetized pull-off magnet 13 and one or two soft iron pull-off elements in the form of soft iron screws 35 and 36 cooperating with a permanent magnet rotor 11 as shown in Fig. 3. It will be understood that, for adjustment of the relative pull-off effects and correction of manufacturing irregularities, the permanent magnet element 13 and the soft iron elements 35 and 36 may each be adjustably mounted with provisions for varying the distance from the element to the rotor 11 to vary the strength of pull-off and with provisions for varying the angular orientation of the element to vary its angular effect. The pull-off magnet 13 may be adjustably mounted (by conventional means not shown in Fig. 3). The soft iron elements 35 and 36 may be threaded into a rotatable carrier 37 to provide for angular adjustment and as shown may be threaded into or out of the carrier 37 to provide strength adjustment.

Ordinarily adjustment of the permanent magnet 13 is not necessary after the design of the instrument has been determined and the magnet has been magnetized and aged to give it the strength desired for the type of instrument in which it is employed. Accordingly the magnet 13 may be mounted in a fixed position as illustrated in Fig. 1 which will be explained more in detail hereinafter.

Figs. 1, 2, 3 and 4 illustrate the manner of employing the combination of permanent magnet and soft iron pull-off in a temperature indicator of a type described in my aforesaid patent application, Serial No. 465,079. This type of temperature indicator comprises a bridge circuit (not shown in the present application) and a cross coil instrument corresponding to a ratio instrument having two circuits and which is responsive to the relative currents in the two circuits.

The instrument illustrated comprises an insulated base and terminal block 38 (Figs. 1 and 2), a frame 39 secured to the terminal block 38, a sub-bridge and cover 40 secured to the top of the frame 39, a top bridge 41 secured to posts 42 protruding through the sub-bridge 40, a magnetic shield 37 rotatably mounted within the frame 39, the magnetic rotor 11 carried by a shaft 43 rotatably mounted within the frame 39 substantially concentric with the magnetic shield 37 and a stationary magnetic field structure for producing magnetic fields varying in a resultant angular direction to produce rotation of the rotor 11 in accordance with variations in an indication or measurement to be produced.

The stationary field structure comprises a main winding and an auxiliary winding. The former consists of four coils 44, 45, 46 and 47 (Fig. 3) electrically connected in series and wound around a hollow winding form 48 with a common magnetic axis transverse to and substantially intersecting the rotor spindle 43. The auxiliary or cross-coil winding consists of a pair of coils 49 and 50 electrically connected in series and also having a common magnetic axis transverse to and substantially intersecting the rotor spindle 43, but substantially perpendicular to the magnetic axis of the main winding consisting of the coils 44 to 47. The electrical field windings and the winding form 48 are of such shape to cause the space within the magnetic shield 37 to be substantially filled. The winding form 48 is of split construction to facilitate assembly and has a substantially cylindrical opening 51 therein to receive the rotor 11. A damping cup may be provided consisting of a split hollow metallic cylinder 48' at the interior of the winding form 48. The element 37 previously referred to as a carrier for the screws 35 and 36 in connection with Fig. 3 is composed of magnetically permeable material so as to serve as a magnetic shield for the instrument.

The rotor 11, as represented in Fig. 3 by dotted lines, is in the shape of a right circular cylinder with flattened sides. Suitable openings are left in the bottom and the top of the main winding and the winding form 48 to receive the rotor spindle 43. Likewise an opening 52 is provided in the sub-bridge or cover 40 for the upper end of the rotor spindle 43.

The pull-off magnet 13 may consist of a bar of high coercive force low permeability magnetic material secured to the sub-bridge 40, which in this case is composed of non-magnetic material. For example, the opening 52 may be extended to form slots 53 of suitable shape to receive the bar magnet 13, and the edges of the slot 53 may be peened over at the points 54 to hold the pull-off magnet 13 in place, as illustrated in Figs. 1 and 4.

It will be apparent that the relative magnitudes of the electrical currents flowing in the main winding consisting of the coils 44, 45, 46, and 47 and the auxiliary windings consisting of the coils 49 and 50 will determine the resultant angular direction of the magnetic field produced by the field windings. This in turn will determine the angular position of the rotor 11 and the pointer 14 with respect to the scale 32 so long as the electrical windings are properly energized. However, in case of a failure of power, the electrical field windings will cease to control the position of the rotor 11, and it will be deflected to the angular position determined by the pull-off elements 13 and 35 or 36. As explained in connection with Fig. 8 the reaction between the magnetic rotor 11 and the pull-off elements will cause the pointer 14 to deflect to the left beyond the zero point 33 of the scale 32.

The represented position of the magnet 13 in Fig. 3 does not correspond strictly with that shown in Fig. 1 as its position has been moved to permit more clearly representing the rotor 11 in Fig. 3.

It will be observed that in the arrangement of Figs. 1 to 4 the angular direction of the mid scale position is along a line 55, 56 shown in Fig. 3 corresponding to the 270 degree point of Fig. 8. The angular direction of the pull-off field resulting from magnetism induced in the soft iron pull-off elements 35 or 36 is along the line 57, 58 corresponding to the 315 degree point of Fig. 8. The magnetic axis of the pull-off magnet 13 is along the line 59, 60 corresponding to the zero degree point of Fig. 8. It will be understood that in the arrangement of Fig. 3 the magnetic flux emanating from the pull-off magnet 13 and acting upon the rotor 11 will be along a diameter 61, 62 with the lines of flux passing from the end 61 of the diameter to the end 62 which is equivalent to having a permanent magnet placed in the line 61, 62 with its north-seeking pole toward the end 62 and its south-seeking pole toward the end 61 corresponding to the arrangement of Fig. 8.

Although in Fig. 3 I have shown soft iron pull-off elements in the form of screws 35 and 36, it will be understood that my invention is not limited to this specific arrangement and the soft iron pull-off effect may be obtained from the conformation of the magnetic shield 37 itself, if there is any eccentricity or if one side thereof is flattened, or if the shield 37 is not perfectly circular. For example, if desired the shield 37 may be slightly elliptical with a difference of 3/1000 or 4/1000 of an inch between the major and minor axes in an instrument having a shield diameter of 5/8 inch. Thus, the effect of the soft iron elements 35 and 36 will be obtained by making the shield elliptical with its minor axis along the line 57, 58 and with the major axis of the ellipse perpendicular to the line 57, 58.

It will be understood that circular grooves 63 and 64 are provided in the bottom of the frame 39 and in the end surface of the sub-bridge 40 to receive the circular or slightly elliptical shield 37. The widths of the grooves 63 and 64 are made sufficient to permit rotation of the shield 37 in the grooves although it may not be perfectly circular. Thus, angular adjustment of the shield 37 is provided and the shield 37 is capable of being secured in the desired angular position when the proper adjustment is found by screws 65 or other suitable means which serves to hold down the cover and sub-bridge 40 against the top edge of the magnetic shield 37. In fact, I have found that frequently manufacturing irregularities in the case of shields intended to be circular cylinders are sufficient to provide soft iron pull-off torque effect. It is highly important in the case of such manufacturing irregularities to rotate the shield 37 to the proper angular position and to secure it there. Otherwise the pull-off effect in the scale range of the instrument may correspond to that shown at the 90 degree point in Fig. 8 or the peak 66 of the resultant curve 29 in Fig. 9. The use of elements such as screws 35 or 36 may be desirable for strength adjustment even when the shield 37 serves as a soft iron pull-off element.

Although I have referred to the pull-off effect of the low coercive force magnetizable elements 17, 35, 36 or 37 as the "soft iron effect," it will be understood that the pull-off element or elements which are not permanently magnetized may be composed of any suitable relatively permeable magnetic material. In the case of the magnetic shield 37, for example, satisfactory results are obtained by utilizing an alloy sold under the name of "Mu-metal."

My invention is not limited to the employment of the combination permanent-magnet, soft-iron pull-off arrangement in indicators of the specific type disclosed in Figs. 1 to 4. Fig. 5 shows an instrument comprising a cylindrical or slightly elliptical magnetic shield 37 enclosing a pair of angularly mounted field coils 67 having radial magnetic axes at an angle of about 120 degrees intersecting the axis of rotation 12 of a rotor, which may in this case consist of a cylindrical magnet 68 magnetized transversely to its axis of rotation. A pull-off magnet 13 is mounted at a suitable point within the magnetic shield 37 and soft-iron pull-off elements 17 are also mounted within the magnetic shield 37. As explained in connection with Figs. 1 to 4 the soft-iron pull-off effect may be obtained from the eccentricity of the shield 37 instead of employing separate elements 17.

With a uniform pull-off torque throughout the length of the scale angle of the instrument, it will be apparent that the only effect of the pull-off field is to deflect the pointer slightly in the down scale direction from the position it would have if there were no pull-off field. This effect may be taken care of by shifting the pointer on the rotor or shifting the scale slightly. If a non-uniform pull-off field were employed, it would be necessary to calibrate the scale and a different calibration would be required for each different type of instrument. This would preclude the use of standard printed scales with all the instruments of a given type. Consequently, the use of my uniform pull-off torque arrangement has the advantage of making it unnecessary to recalibrate the scale of the instrument when a pull-off feature is provided in the instrument. It also has the advantage of permitting fixed scales to be used with all instruments of a given type whether or not the pull-off feature is to be utilized and whether or not the instrument or the system in which it is employed is such as to produce a linear scale calibration.

Another important advantage of having the pull-off torque uniform is that it permits utilizing a weaker pull-off than that which would otherwise be required. With a non-uniform field the pull-off effect is usually a minimum near the zero end of the scale. It is therefore necessary to make the pull-off field strong enough to move the pointer off scale from the zero position. The result is that excessively strong pull-off fields are required in other regions of the scale. Accordingly the use of a uniform pull-off field minimizes voltage and temperature errors because it is not necessary to provide so much torque or have so much wire dissipating heat in the field windings of the instrument.

Temperature compensation may, however, be employed in combination with the pull-off arrangement described in connection with the foregoing types of instruments. For example, the soft-iron pull-off elements 17 may be composed of blocks of permeable magnetic material having a permeability which varies in response to temperature. For instance, one or more of such blocks may be mounted at the inner surface of the magnetic shield 37 at the position 17 represented in Fig. 5 in the manner described in connection with Fig. 1 of my co-pending application, Serial No. 466,436. Such temperature compensating elements may be composed of an alloy known as carpenters' steel, or of the alloy described in Patent No. 1,706,172, Kinnard, which consists of 40 to 20 per cent copper, 60 to 80 per cent nickel, and including about 2 per cent iron.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A pull-off arrangement for a moving magnet instrument having a scale, one end of which is referred to as the zero end of the scale, said arrangement comprising in combination with the movable magnet of the instrument a permanent magnet mounted in such a position as to attract the movable magnet of the instrument to a position beyond that corresponding to the zero end of the scale and a magnetizable element composed of low coercive force magnetic material mounted in such a position as to attract the movable magnet of the instrument still further beyond the said zero scale end position, the relative strengths of the magnets and the dimensions of the magnetizable element being chosen to make the maximum reaction between the magnetizable element and the movable magnet approximately $\frac{1}{10}$ of the maximum reaction between the said permanent magnet and the movable magnet of the instrument.

2. A pull-off arrangement for a moving magnet instrument having a scale one end of which is referred to as the zero end of the scale, said arrangement comprising in combination with the movable magnet of the instrument a permanent magnet mounted in such a position as to attract the movable magnet of the instrument to a position beyond that corresponding to the zero end of the scale and a magnetizable element composed of low coercive force magnetic material mounted in such a position as to attract the movable magnet of the instrument still further beyond the said zero scale end position.

3. A pull-off arrangement for a moving magnet instrument having a scale one end of which is referred to as the zero end of the scale, said arrangement comprising in combination with the movable magnet of the instrument, which has a position corresponding to the zero end of the scale, a permanent magnet and a magnetizable element composed of low coercive force magnetic material, each of the two latter elements being mounted in such a position as to attract the movable magnet beyond its zero scale end position.

4. A pull-off arrangement for a deflecting pointer instrument having a scale one end of which is referred to as the zero end of the scale and having a movable magnet one position of which corresponds to the zero end of the scale, said arrangement comprising in combination with the movable magnet a permanent magnet mounted in a position to deflect the movable magnet in a direction toward the zero end of the scale, and a magnetizable element composed of low coercive force magnetic material mounted to deflect the movable magnet further in the direction toward which it is deflected by the permanent magnet when near the zero position.

5. A pull-off arrangement for a deflecting pointer instrument having a scale one end of which is referred to as the zero end of the scale and having a movable magnet, one position of which corresponds to the zero end of the scale, said arrangement comprising in combination with such a movable magnet a stationary permanent magnet mounted in a position to deflect the movable magnet in the down-scale direction and a stationary magnetizable element composed of low coercive force material mounted in such a position as to deflect the movable magnet in a down scale direction when the movable magnet is near the zero scale end position, at least one of said stationary elements being positioned to deflect the movable magnet in the down-scale direction beyond its zero scale end position.

6. A pull-off arrangement for a deflecting pointer instrument having a scale one end of which is referred to as the zero end of the scale and comprising first and second relatively movable members, one of the relative positions of which corresponds to the zero end of the scale, the first of said relatively movable members comprising a magnet and the second of said relatively movable members comprising a plurality of elements, one of which constitutes an element for reacting with the said magnet and producing relative movement in the up-scale direction between said relatively movable members, said pull-off arrangement comprising in combination with said magnet a pair of pull-off elements mounted on the second relatively movable member, the first of said elements comprising a pull-off magnet and the second comprising a magnetizable element composed of low coercive force magnetic material, said pull-off elements each being mounted in such a position on the second relatively movable member as to tend to produce relative motion between said members in the down-scale direction.

FREDERICK R. SIAS.